United States Patent
Wang et al.

(10) Patent No.: US 9,800,998 B2
(45) Date of Patent: Oct. 24, 2017

(54) DEVICE INITIATED TRIGGERS

(71) Applicant: InterDigital Patent Holdings, Inc., Wilmington, DE (US)

(72) Inventors: Chonggang Wang, Princeton, NJ (US); Michael F. Starsinic, Newtown, PA (US); Lijun Dong, San Diego, CA (US); Qing Li, Princeton Junction, NJ (US); Zongrui Ding, Portland, OR (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/443,650

(22) PCT Filed: Nov. 19, 2013

(86) PCT No.: PCT/US2013/070741
§ 371 (c)(1),
(2) Date: May 18, 2015

(87) PCT Pub. No.: WO2014/078837
PCT Pub. Date: May 22, 2014

(65) Prior Publication Data
US 2015/0312700 A1   Oct. 29, 2015

Related U.S. Application Data

(60) Provisional application No. 61/727,934, filed on Nov. 19, 2012.

(51) Int. Cl.
*H04W 4/00* (2009.01)
*H04L 29/12* (2006.01)
*H04W 72/04* (2009.01)

(52) U.S. Cl.
CPC ........ *H04W 4/005* (2013.01); *H04L 61/2007* (2013.01); *H04W 72/0406* (2013.01)

(58) Field of Classification Search
None
See application file for complete search history.

(56) References Cited

U.S. PATENT DOCUMENTS

2013/0083653 A1* 4/2013 Jain ................. H04W 4/005
370/230
2013/0273855 A1   10/2013 Cherian et al.
(Continued)

FOREIGN PATENT DOCUMENTS

| CN | 102523315 A | 6/2012 |
| JP | 2015-519790 A | 7/2015 |
| WO | WO 2013/091383 A1 | 6/2013 |

OTHER PUBLICATIONS

3rd Generation Partnership Project (3GPP), S2-114189, "MTC Device Bearer Level Trigger", Huawei, Hisilicon, SA WG2 Meeting #87, Jeju, Korea, Oct. 10-14, 2011, 6 pages.
(Continued)

*Primary Examiner* — Hassan Kizou
*Assistant Examiner* — Hashim Bhatti
(74) *Attorney, Agent, or Firm* — Condo Roccia Koptiw LLP

(57) ABSTRACT

Embodiments contemplate wireless communication that may include sending machine type communication (MTC) application data from a services capability server (SCS) to an MTC user equipment (UE/WTRU) using a device trigger. The device trigger may be used to instruct an MTC device application to initiate communications with an SCS. Embodiments also contemplate that a first device trigger (DT) request may be received from a first wireless transmit/receive unit (WTRU) and a machine-type-communication inter-working function (MTC-IWF) may be determined in response to the first DT request. A second DT request may be sent to the MTC-IWF; and a first DT response may be
(Continued)

received from the MTC-IWF. The first DT response may include a first information regarding a second WTRU.

14 Claims, 19 Drawing Sheets

(56) References Cited

U.S. PATENT DOCUMENTS

2014/0185522 A1* 7/2014 Xu .................... H04W 4/005
                                                    370/328
2014/0219182 A1* 8/2014 Chandramouli ...... H04W 4/005
                                                    370/328
2014/0307632 A1* 10/2014 Kim .................. H04W 4/005
                                                    370/328

OTHER PUBLICATIONS

3rd Generation Partnership Project (3GPP), S2-120806, "Serving Node Selection for SMS Delivery or Device Triggering", SA WG2 Meeting #89, Vancouver, Canada, Feb. 6-10, 2012, 4 pages.
3rd Generation Partnership Project (3GPP), TS 22.368 V11.5.0, "Technical Specification Group Services and System Aspects, Service requirements for Machine-Type Communications (MTC); Stage 1 (Release 11)", Jun. 2012, pp. 25 pages.
3rd Generation Partnership Project (3GPP), TR 22.888 V0.7.0, "3rd Generation Partnership Project; Technical Specification Group Services and System Aspects; Study on Enhancements for MTC; (Release 11)", TSG-SA WG1 Meeting #58, Seville, Spain, May 7-11, 2012, 23 pages.
3rd Generation Partnership Project (3GPP), TR 22.803 V0.3.0, "3rd Generation Partnership Project; Technical Specification Group SA; Feasibility Study for Proximity Services (ProSe) (Release 12)", May 2012, pp. 24 pages.
3rd Generation Partnership Project (3GPP), TS 23.682 V11.1.0, "3rd Generation Partnership Project; Technical Specification Group Services and System Aspects; Architecture enhancements to facilitate communications with packet data networks and applications (Release 11)", Jun. 2012, pp. 18 pages.
3rd Generation Partnership Project (3GPP), S1-120348, "Technical Specification Group Services and System Aspects, Study on Enhancements for MTC, (Release 11)", 3GPP TSG-SA WG1 Meeting #57, Kyoto, Japan, Feb. 13-17, 2012 , pp. 1-23.
3rd Generation Partnership Project (3GPP), S2-113401, "Device Triggering from the MTC Device", ETRI, SA WG2 Meeting #86, Naantali, Finland, Jul. 11-15, 2011, pp. 1-4.
3rd Generation Partnership Project (3GPP), TR 23.888 V11.0.0, "Technical Specification Group Services and System Aspects, System Improvements for Machine-Type Communications (MTC) (Release 11)", Sep. 2012, pp. 1-165.
3rd Generation Partnership Project (3GPP), TS 23.682 V11.2.0, "Technical Specification Group Services and System Aspects, Architecture Enhancements to Facilitate Communications with Packet Data Networks and Applications", Sep. 2012, pp. 1-29.
3rd Generation Partnership Project (3GPP), TS 29.368 V11.0.0, "Technical Specification Group Core Network and Terminals, Tsp Interface Protocol between the MTC Interworking Function (MTC-IWF) and Service Capability Server (SCS) (Release 11)", Sep. 2012, pp. 1-23.

* cited by examiner

| Information Element | Description |
|---|---|
| Sender External Identifier | MSISDN, FQDN, URI, IP Address etc. |
| Sender Application Identifier | Port Number, etc. |
| Sender SCS External Identifier | MSISDN, FQDN, URI, IP Address etc. |
| Recipient External Identifier | MSISDN, FQDN, URI, IP Address etc. This could also be a group ID |
| Recipient Application Identifier | Port Number, etc. |
| Recipient's SCS Address | |
| Trigger Reference Number | |
| Trigger Reason | |
| D2D Mode | The communication mode that should be used for the D2D connection (direct D2D, indirect D2D, network-assisted D2D). |
| Sender Capabilities | |
| Validity Period | |
| Priority | |
| Application Payload | |
| Sender Context | The context information about the sender UE such as service category/type it supports, service category/type if requests, its location, its moving speed and moving direction, its residual power, etc |
| IP Address | The IP address of the sender UE |

FIG. 8

| Information Element | Description |
|---|---|
| Recipient External Identifier | MSISDN, FQDN, URI, IP Address etc. |
| Recipient Application Identifier | Port Number, etc. |
| Trigger Reference Number | |
| Recipient's SCS Identifier | So that future trigger requests can be directed here |
| D2D Mode | The communication mode that should be used for the D2D connection (direct D2D, indirect D2D, network-assisted D2D). |
| Recipient Capabilties | |
| Rejection (or Accepted) | |
| Rejection Cause | |
| Failure (or Success) | |
| Failure Cause | |
| Charging Info | Charging related information such as charging policy, charging scheme, rate, etc |
| Recipient Context | The context information about the recipient UE such as service category/type it supports, service category/type if requests, its location, its moving speed and moving direction, its residual power, etc |

FIG. 9

DEVICE INITIATED TRIGGERS

CROSS-REFERENCE TO RELATED APPLICATIONS

This application is the National Stage Entry under 35 U.S.C. 371 of Patent Cooperation Treaty Application No. PCT/US2013/070741, filed Nov. 19, 2013, which claims the benefit of U.S. Provisional Patent Application No. 61/727,934, titled "Device Initiated Triggers", filed Nov. 19, 2012, the entire contents of both of which being hereby incorporated by reference as if fully recited herein, for all purposes.

BACKGROUND

An MTC application may be hosted on an MTC User Equipment/Wireless Transmit Receive Units (UE/WTRU). A UE/WTRU MTC application may be an MTC communication endpoint which may interact with one or more of:
  Service Capability Servers (SCSs);
  Applicant Server (AS) MTC Applications; and/or
  Other UE/WTRU MTC Applications.
An MTC application may be hosted on an AS. An AS MTC application may be an MTC communication endpoint which may interact with one or more:
  SCSs;
  UE/WTRU MTC Applications; and/or
  Other AS MTC Applications.

SUMMARY

A method for wireless communication includes sending machine type communication (MTC) application data from a services capability server (SCS) to an MTC user equipment (UE) using a device trigger. The device trigger may be used to instruct an MTC device application to initiate communications with an SCS.

Embodiments contemplate one or more D2D triggering techniques that may be used for device to device (D2D) communications (e.g. MTC-to-MTC or UE/WTRU-to-UE/WTRU). For example, embodiments contemplate one or more techniques for device triggering over the user plane, such as D2D Triggering via SCS, in which the originating device may send a device trigger (DT) request message in an IP packet to an SCS. Embodiments contemplate D2D triggering via MTC-IWF, in which the originating device may send a DT request message in an IP packet to an MTC-IWF.

Embodiments contemplate one or more techniques for device triggering over the control plane, such as D2D Triggering via SMS, in which the originating device may send a DT request message in SMS to the terminating device. Embodiments contemplate D2D triggering via the MTC-IWF, in which the originating device may send a DT request message in an NAS message to the MTC-IWF of the recipient. Embodiments contemplate D2D triggering via the Serving Node, in which the originating device may send a DT request message in an NAS message to the serving node of the recipient(s).

Embodiments contemplate D2D triggering via direct D2D radio link, in which the originating device may send a DT request message via a D2D radio link directly to the recipient device in a control message. Embodiments contemplate D2D triggering via an indirect D2D radio link, in which the originating device may send a DT request message, via the originating device's base stations and the recipient device's base station, to the recipient device in a control message.

Embodiments contemplate one or more mechanisms to support group triggering that may be employed in one or more of the embodiments described herein.

Embodiments contemplate one or more techniques for communicating a device trigger that may be performed by a node in communication with a wireless communication network. One or more techniques may comprise receiving a first device trigger (DT) request from a first wireless transmit/receive unit (WTRU). Techniques may also comprise determining a machine-type-communication inter-working function (MTC-IWF) in response to the first DT request. Techniques may also comprise sending a second DT request to the MTC-IWF. Embodiments also contemplate receiving a first DT response from the MTC-IWF. The first DT response may include a first information regarding a second WTRU Embodiments contemplate one or more techniques for communicating a device trigger that may be performed by a first node serving a first wireless transmit/receive unit (WTRU). The first node may be in communication with a wireless communication network. One or more techniques may comprise receiving a first device trigger (DT) request from the first WTRU. Techniques may also comprise determining a second node in response to the first DT request. The second node may serve a second WTRU. Techniques may comprise sending a second DT request to the second node. Techniques may comprise receiving a first DT response from the second node. The first DT response may include a first information regarding the second WTRU.

Embodiments contemplate a first wireless transmit/receive unit (WTRU). The first WTRU may comprise a processor. The processor may be configured, at least, to determine a machine-type-communication inter-working function (MTC-IWF). The processor may be configured to send a device trigger (DT) request to the MTC-IWF via a user plane connection. The DT request may include a first information. The processor may be configured to receive a DT response from the MTC-IWF. The DT response may include a second information regarding a second WTRU.

BRIEF DESCRIPTION OF THE DRAWINGS

A more detailed understanding may be had from the following description, given by way of example in conjunction with the accompanying drawings wherein:

FIG. 8 illustrates a table describing example trigger request fields, consistent with embodiments;

FIG. 9 illustrates a table describing example trigger report fields, consistent with embodiments;

DETAILED DESCRIPTION

Figure 1A:
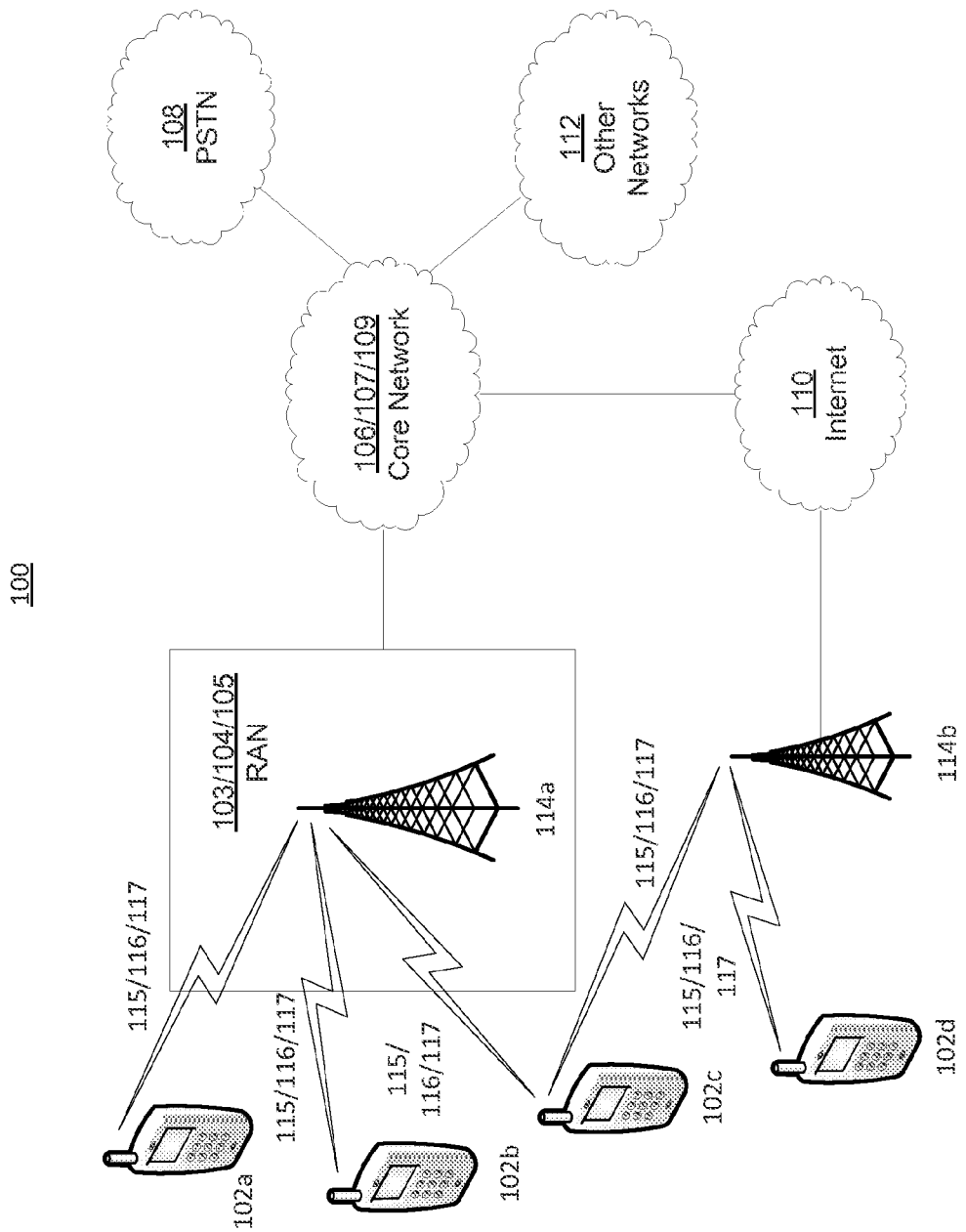
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it may be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it may be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it may be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
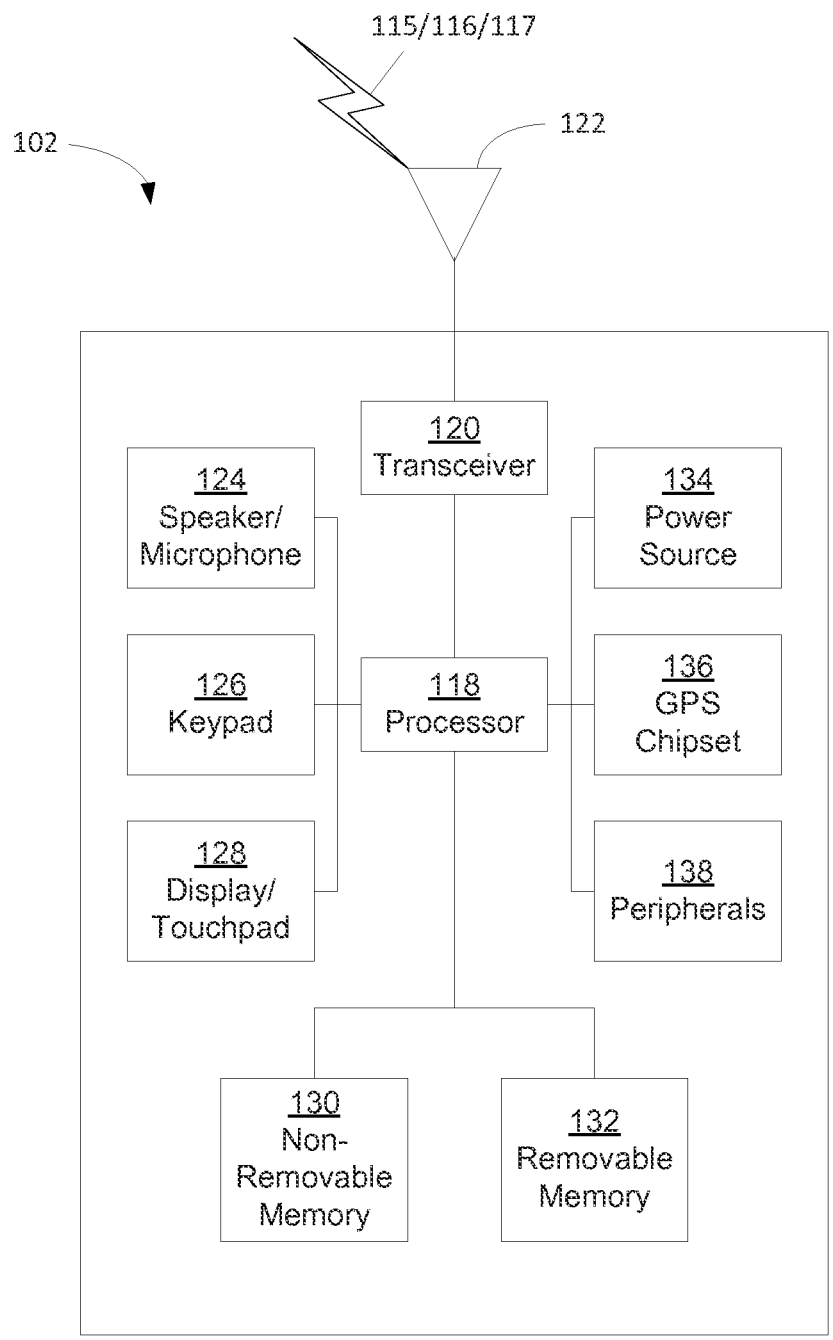
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It may be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It may be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It may be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
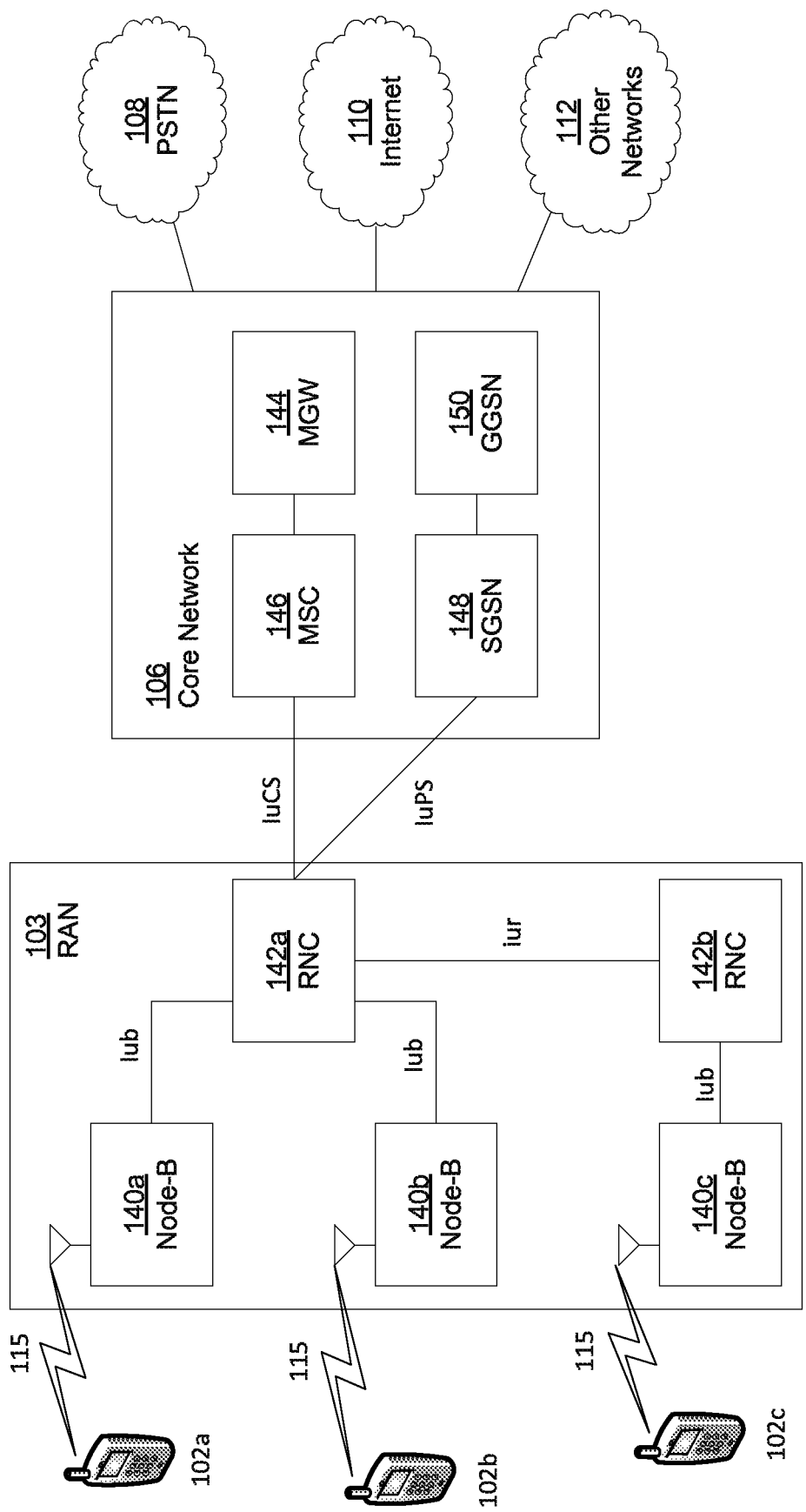
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It may be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it may be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
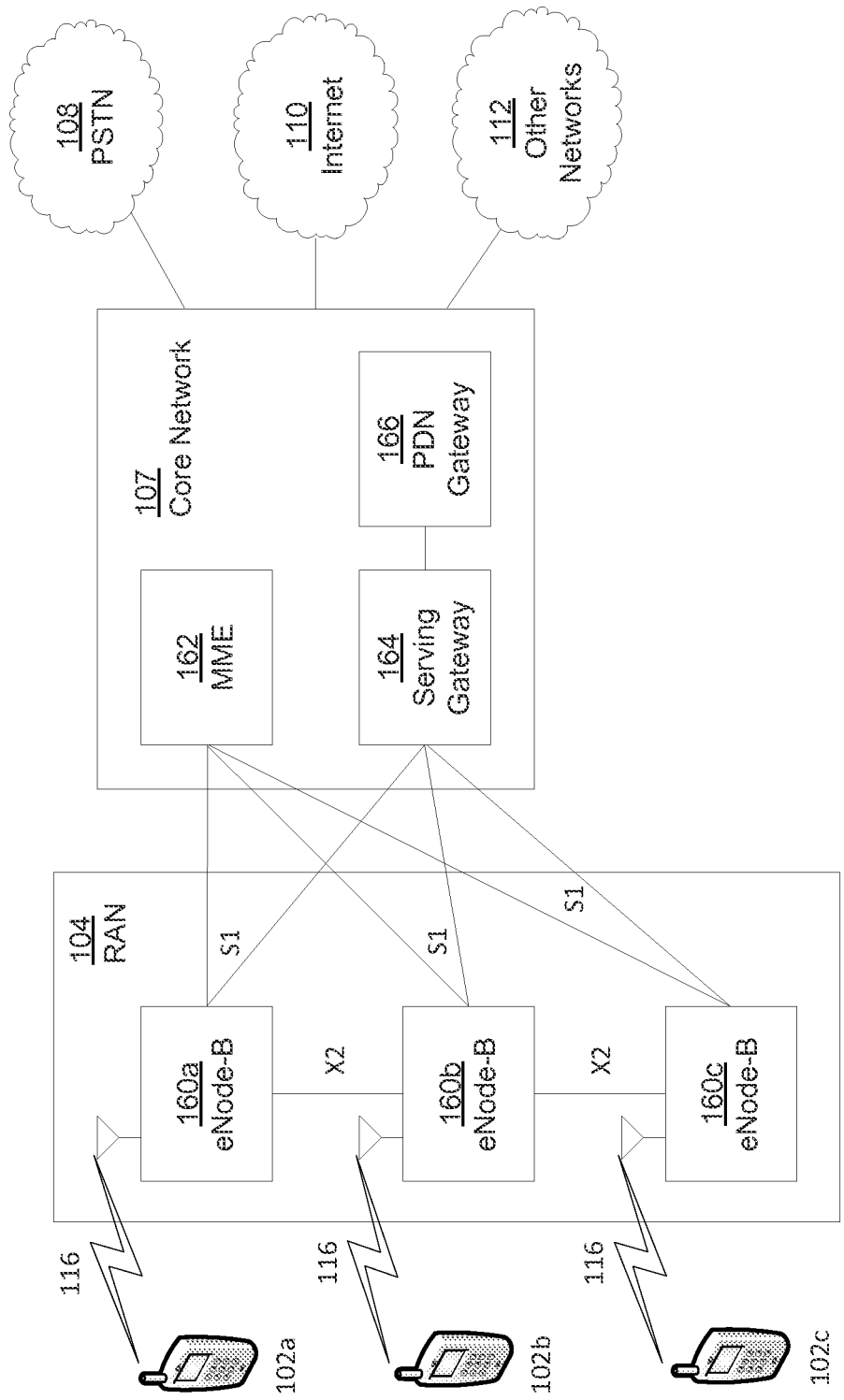
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
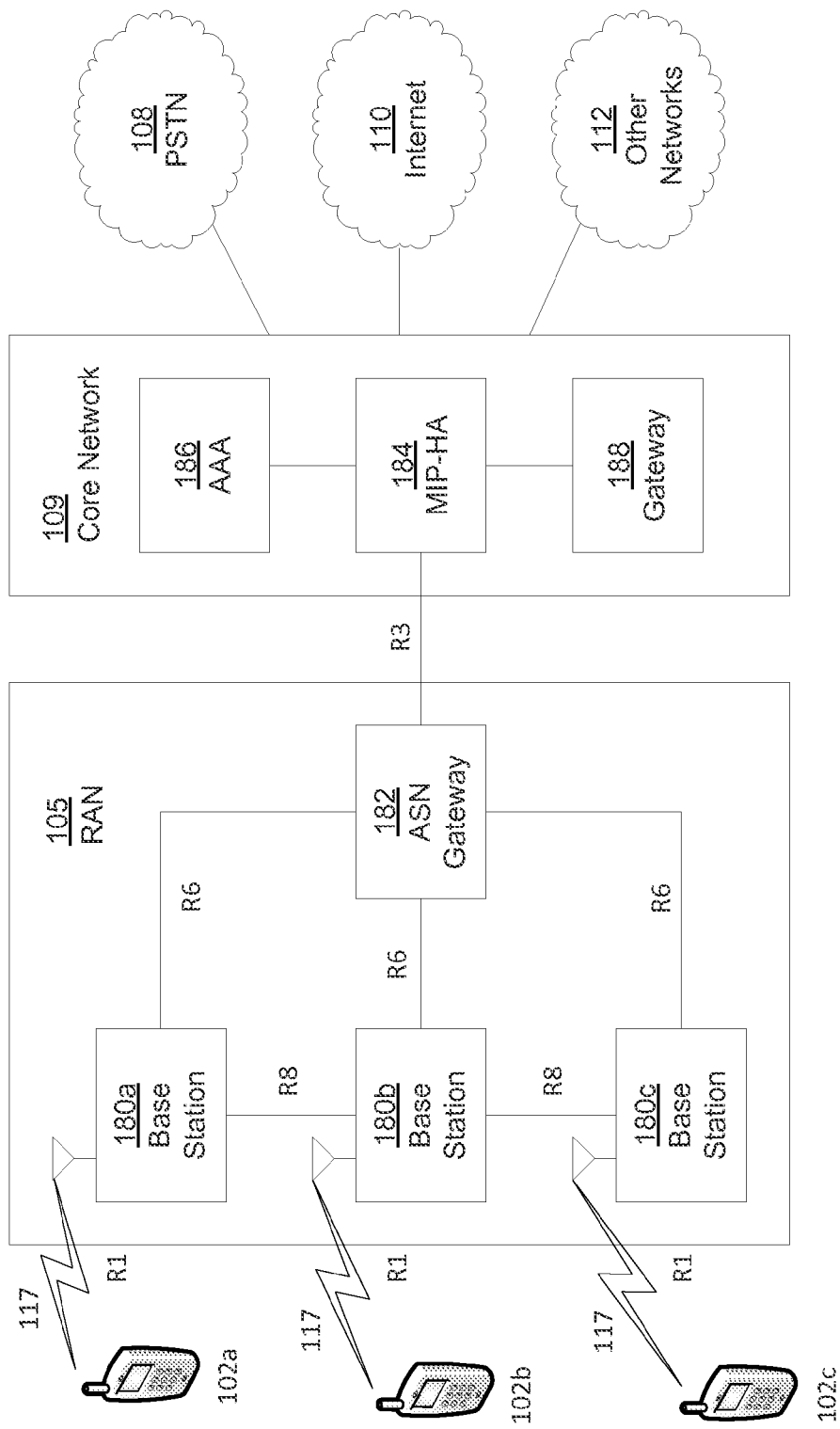
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

By way of explanation, and not limitation, one or more embodiments contemplate the following abbreviations:
AS Application Server
CN Core Network
CS Circuit Switched
D2D Device to Device
DNS Domain Name System
DT Device Trigger
FQDN Fully Qualified Domain name
HSS Home Subscriber Server
IMSI International Mobile Subscriber Identity
ISDN Integrated Service Digital Network
MME Mobile Management Entity
MO Mobile Originated
MS Mobile Station
MSC Mobile Switch Center
MSISDN Mobile Subscription ISDN MT Mobile Terminated
MTC Machine Type Communication
MTC-IWF MTC Inter Working Function
PS Packet Switched
RNTI Radio Network Temporary Identity
SC Service Center
SCS Service Capability Server
SGSN Serving GPRS Support Node
S-GW Serving Gateway
SMS Short Message Service
SMS-SC SMS Service Center
SS7 Signaling System No. 7

Also, one or more embodiments contemplate that the term "serving node" may refer to an MSC, SGSN, S-GW, and/or MME, or the like, for example.

Figure 2:
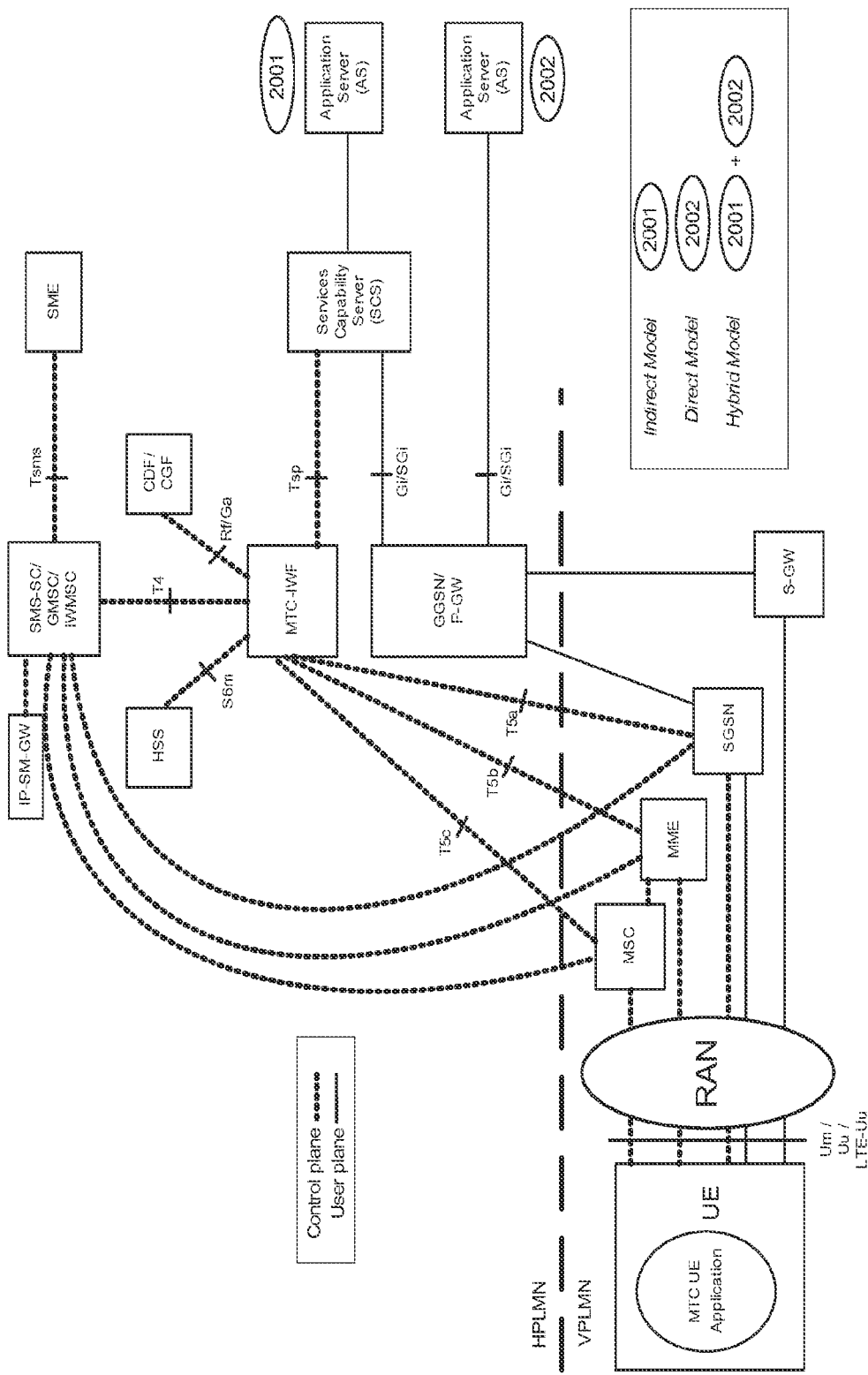
FIG. 2 illustrates an example 3GPP architecture for machine type communication (MTC), consistent with embodiments.

Embodiments recognize that 3GPP TS 23.682 presents the 3GPP architecture for machine-type communication MTC, an example of which is illustrated in FIG. 2. The MTC-related entities in this architecture may include an MTC user equipment UE (or Wireless Transmit/Receive Unit (WTRU)), MTC-IWF, Services Capability Server SCS, and/or an Application Server AS, among other nodes/devices. Embodiments also recognize that 3GPP TS 23.368 provides some description for the 3GPP M2M Architecture. For example, the Tsms and Tsp interfaces may have reference points.

Figure 3:
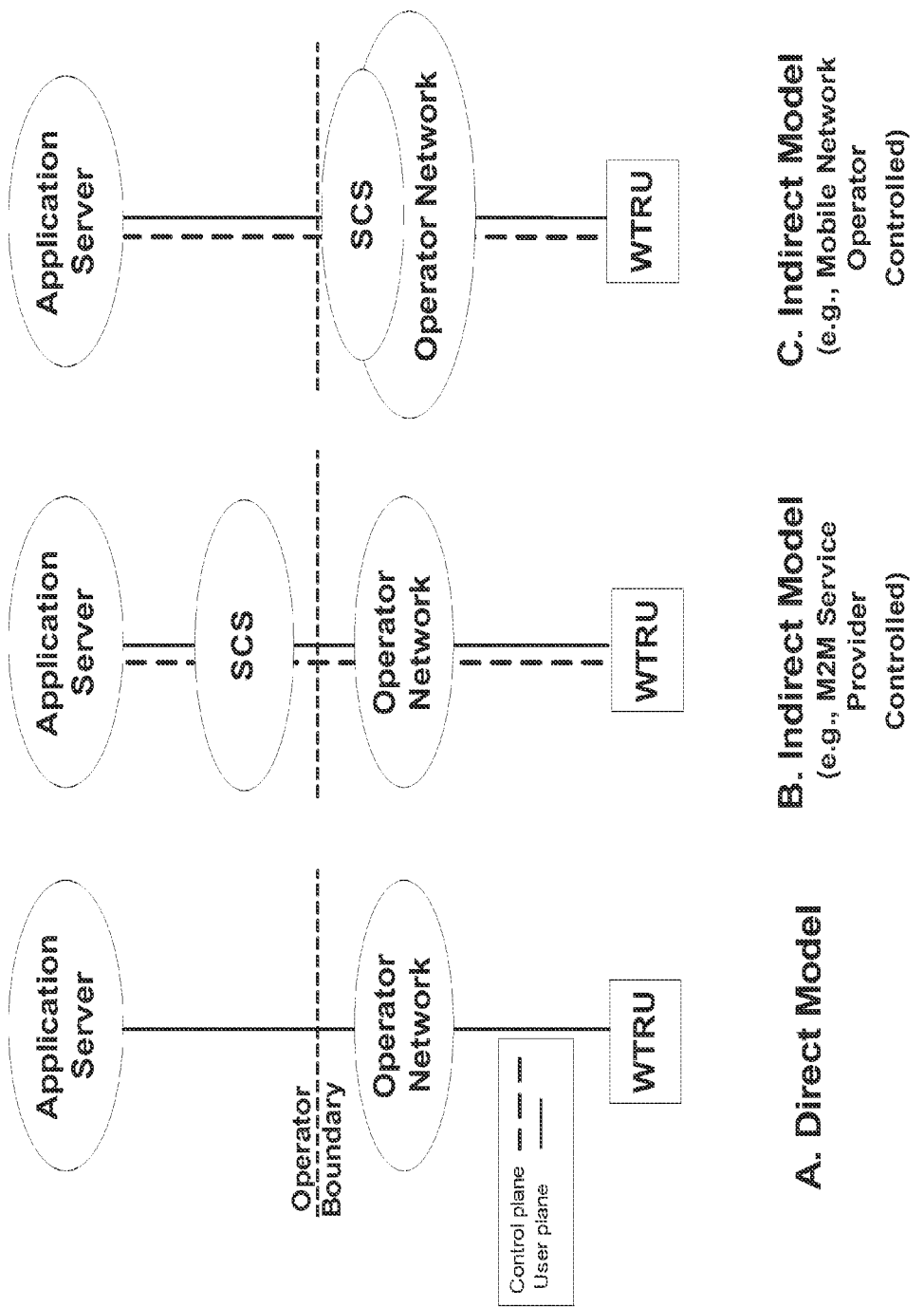
FIG. 3 illustrates example deployment scenarios for a services capability server (SCS), consistent with embodiments.

An SCS may be controlled by the operator of the Home Public Land Mobile Network HPLMIN and/or by an MTC Service Provider. The deployment of an SCS may be inside or outside the operator domain as illustrated in FIG. 3. The SCS may be considered an internal network function and/or may operator controlled, for example when the SCS may be deployed inside the operator domain. The SCS may be MTC Service Provider controlled, for example when the SCS may be deployed outside the operator domain. In such scenarios, among other scenarios, security and/or privacy protection may be useful for communication between the MTC-IWF and SCS.

The following paragraphs provide an overview description of one or more of the 3GPP defined MTC entities and/or functions shown in FIGS. 2 and 3.

The Services Capability Server (SCS) is an entity that may connect to the 3GPP network to communicate with UE/WTRU MTC applications and/or the MTC-IWF in the HPLMN and/or an SMS-SC for device triggering. The SCS may offer capabilities for use by one or more MTC Applications.

A UE/WTRU may be equipped for Machine Type Communication and/or may communicate through a PLMN with one or more SCSs and/or one or more other MTC UEs/WTRUs. An MTC UE/WTRU may host one or more MTC UE/WTRU Applications. One or more corresponding MTC applications in the external network may be hosted on one or more AS(s) or SCS(s). An MTC UE/WTRU may also be a device that might not have any cellular radio and/or may use a cellular gateway to access the PLMN.

An Application Server (AS) (e.g., 2001 and/or 2002) may host one or more MTC Applications. An AS may interface with one or more SCS(s) and/or a GGSN/P-GW.

An MTC Inter-Working Function (MTC-IWF) may hide the internal PLMN topology from the SCS. The MTC-IWF may relay/translate signaling protocols that may be used between itself and the SCS (e.g., over Tsp reference point), perhaps to support MTC functionality in the PLMN such as MTC UE/WTRU triggering.

Embodiments contemplate that device triggers may be used to send small amounts of MTC device application data from an SCS to an MTC UE/WTRU. For example, device triggers may be used to send an amount (e.g., a relatively small amount) of data to an application, perhaps when no response may be expected, among other scenarios (e.g., such as when only a small response may be expected, or the like). Again by way of example, an SCS (or other node) may use a device trigger to instruct a sensor to turn on. No IP connection might be useful, for example if the SCS may expect no response.

Device triggers may be used to instruct an MTC device application to initiate communications with an SCS. In some embodiments, the MTC UE/WTRU may obtain at least one IP address, perhaps if it might not already have one. In some embodiments, a device trigger may be useful, perhaps if an SCS (or other node) may wish to address an MTC device application that might not have an IP address (e.g., the MTC might not have obtained an IP address at the time of communication and/or it might not be useful for the MTC device to obtain/use an IP address for the communication, etc.).

Embodiments contemplate delivering (e.g., transmission towards, sending to, and/or forwarding, or the like) a trigger to an MTC device application that may already have an IP address. Embodiments recognize scenarios such as where an SCS may wish to establish a connection with an MTC device application and the SCS might not know the device's IP address. Also, the SCS may be unsure if the MTC device has an IP address. Embodiments recognize that the MTC-IWF may deliver the trigger to the device. Embodiments also recognize that the MTC-IWF may reply to the trigger request with an indication that the device already has an IP address and/or to provide the IP address. Embodiments also recognize that the network operator might charge the SCS for delivering the trigger.

Embodiments recognize that 3GPP TR 22.803 describes discovery and communications between devices in proximity, without describing usefulness for device initiated triggers. Embodiments contemplate that UEs/WTRUs that may discover a peer with which they may wish to connect may be able to send a trigger to the peer.

Figure 4:
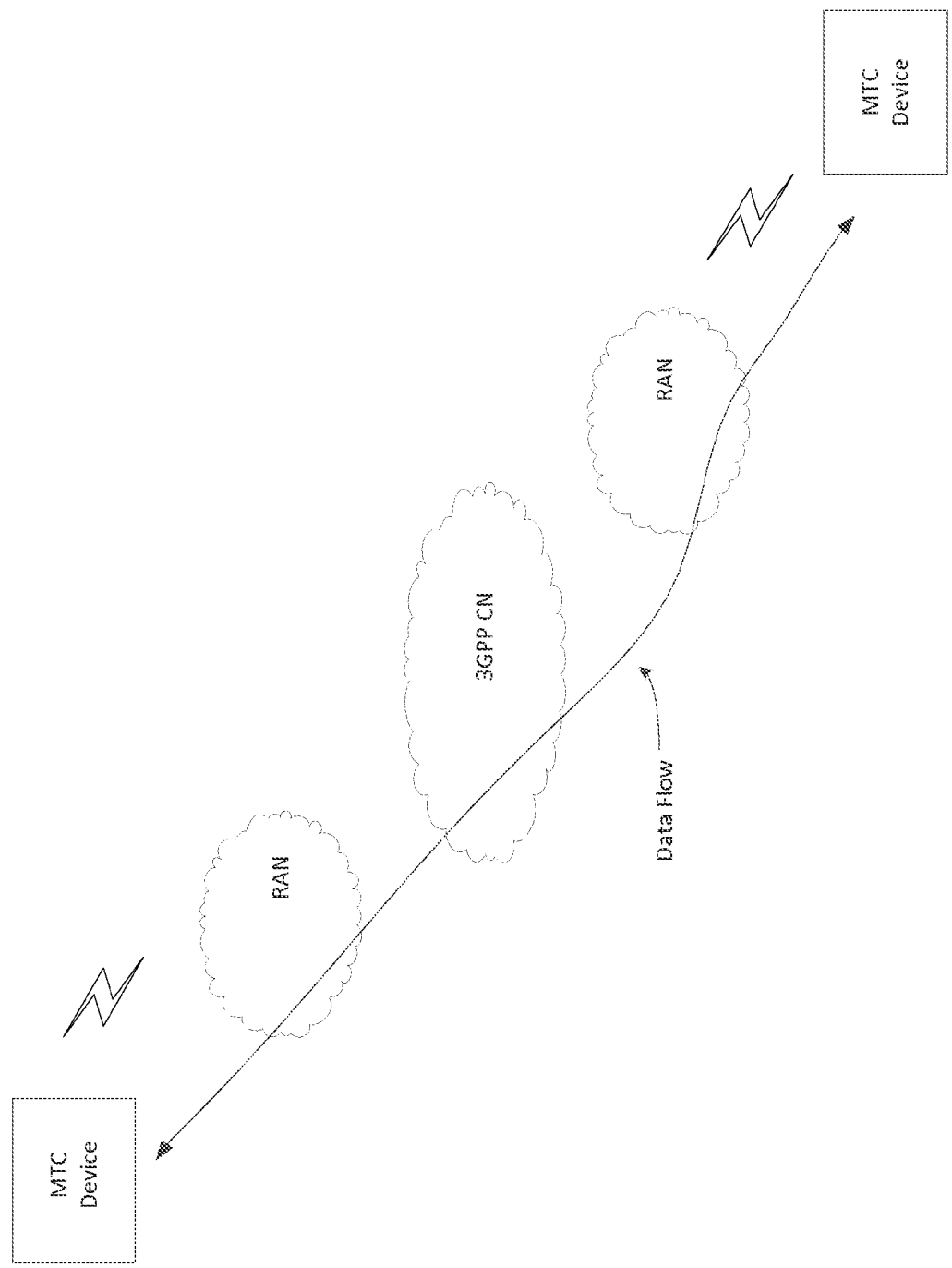
FIG. 4 illustrates an example scheme in which MTC devices may communicate directly with each other, consistent with embodiments.

Embodiments recognize that 3GPP TR 22.888 describes various use cases for MTC D2D communications. Embodiments recognize Direct D2D Communications. For example, in FIG. 4, one MTC device may communicate with another MTC Device directly over 3GPP networks, perhaps if it knows the IP address and/or MSISDN of the target MTC device (which could be either MTC device in FIG. 4).

Figure 5:
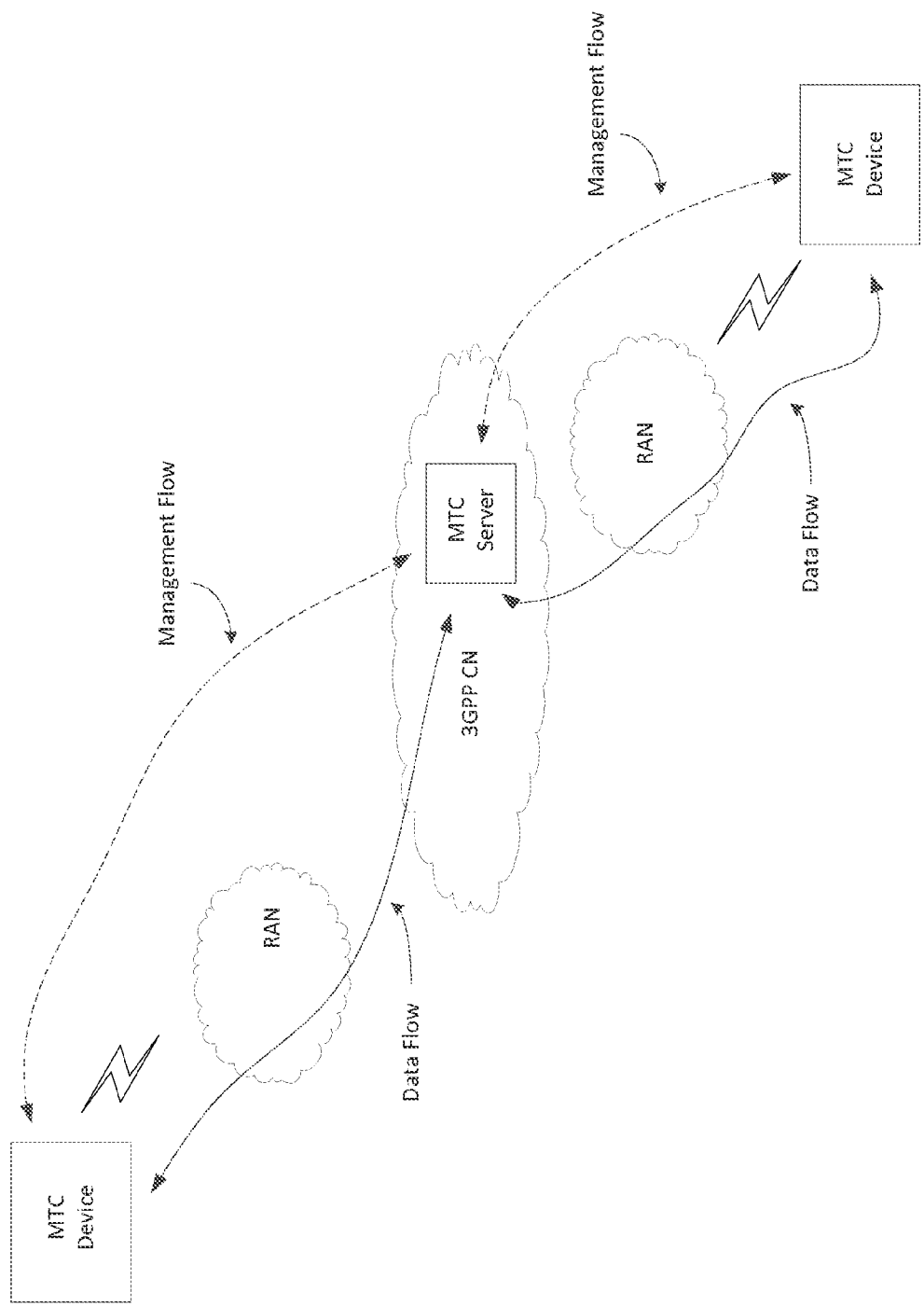
FIG. 5 illustrates an example scheme in which MTC devices may communicate with each other via an MTC server, consistent with embodiments.

Embodiments recognize indirect D2D Communications via an MTC Server. In such scenarios, such as the example illustrated in FIG. 5, some or all data transmission may go through the MTC Server. The MTC Devices might not know the routable identifier of each other while the MTC Server may possess or may be able to provide mechanisms to find the identifiers (routable or un-routable, e.g. IP address, MSISDN, and/or application layer identifier, etc.) of MTC Devices under its control.

Figure 6:
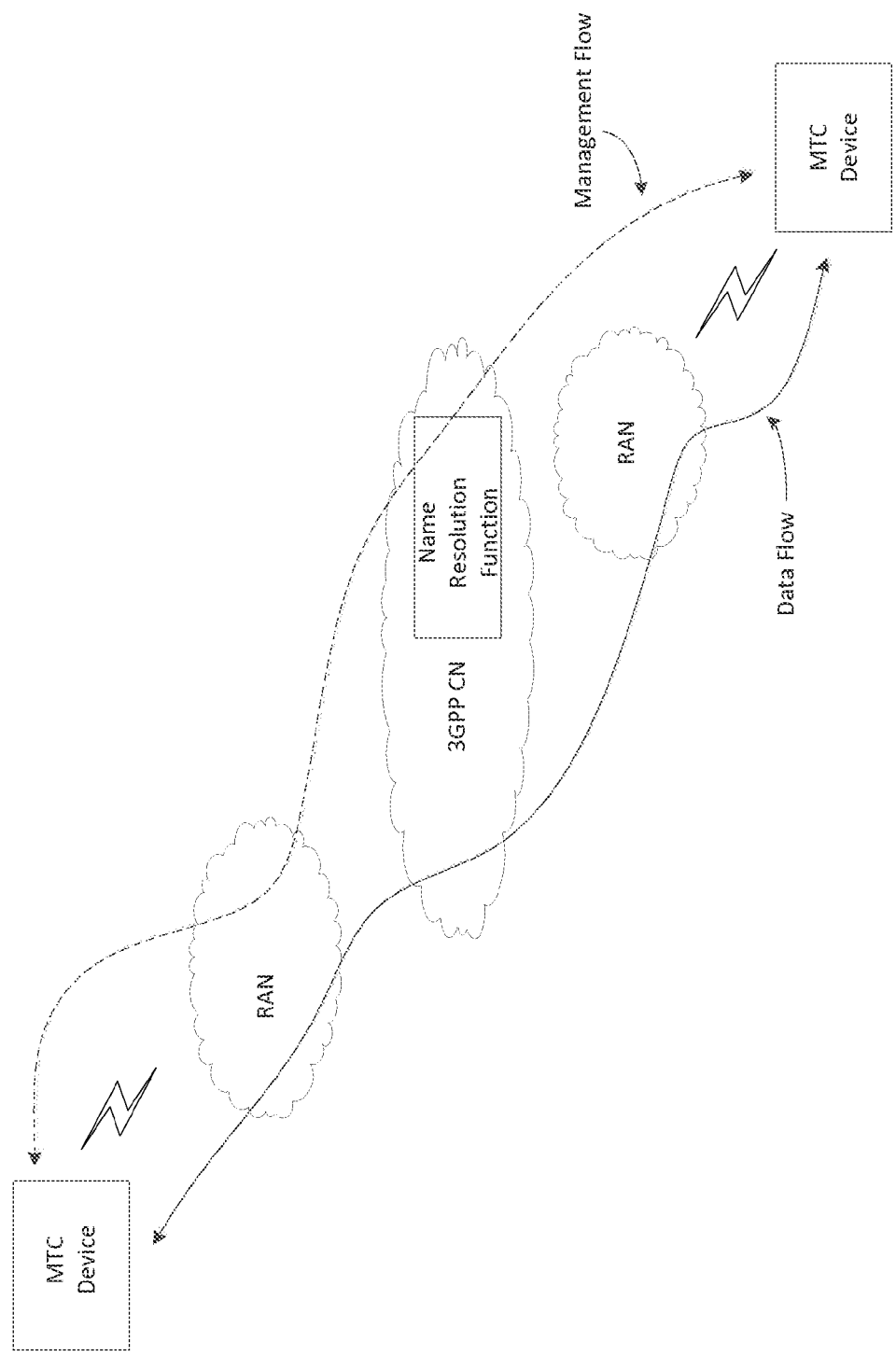
FIG. 6 illustrates an example scheme in which MTC devices communicate with each other with assistance of network/MTC server, consistent with embodiments.

Embodiments recognize Network-Assisted Indirect D2D Communications. In such scenarios, such as the example illustrated in FIG. 6, some or all data transmission may be communicated to each other, with establishment of data session assisted by a Name Resolution Function of network/MTC Server. A Name Resolution Function may be integrated in the existing network entities, e.g. DNS, or in the MTC Server. In such scenarios, the MTC Devices may know no more than the un-routable identifiers of each other (e.g. MSISDN, SIP URI, etc). The types of the identifiers may be according to specific applications. A name resolution function may be able to provide mechanisms to find remote communicating MTC Devices under its control. The originating MTC Device may query the name resolution function with the un-routable identifier of the target MTC Device. The originating MTC device may directly send data to the target MTC Device, for example by retrieving the routable identifiers (e.g. IP address) of the target MTC Device.

Embodiments recognize one or more architectures that may provide for scenarios such as where MTC devices may communicate with an SCS. Embodiments contemplate that it may be useful if at least some communication between devices might not be routed through the SCS. For example, embodiments contemplate that more direct UE/WTRU communication may be useful.

Embodiments contemplate one or more scenarios, such as a motion activated video camera that may steam video to a UE/WTRU. Sometimes, the camera and UE/WTRU may maintain no connection. In some embodiments, an event (e.g., motion detected) may motivate the camera to offer to stream video to the UE/WTRU. One or more embodiments contemplate that it might not be assumed that the video camera knows the IP address of the UE/WTRU, and/or that the UE/WTRU may even have an IP address.

Embodiments recognize device trigger mechanisms definitions for scenarios where an SCS may trigger MTC Devices via MTC-IWF. Embodiments contemplate that such definitions might not be applicable and/or inefficient for device to device communications. Embodiments contemplate one or more mechanisms that may allow devices to send triggers to one or more other devices, for example directly to one or more other device.

Figure 7:
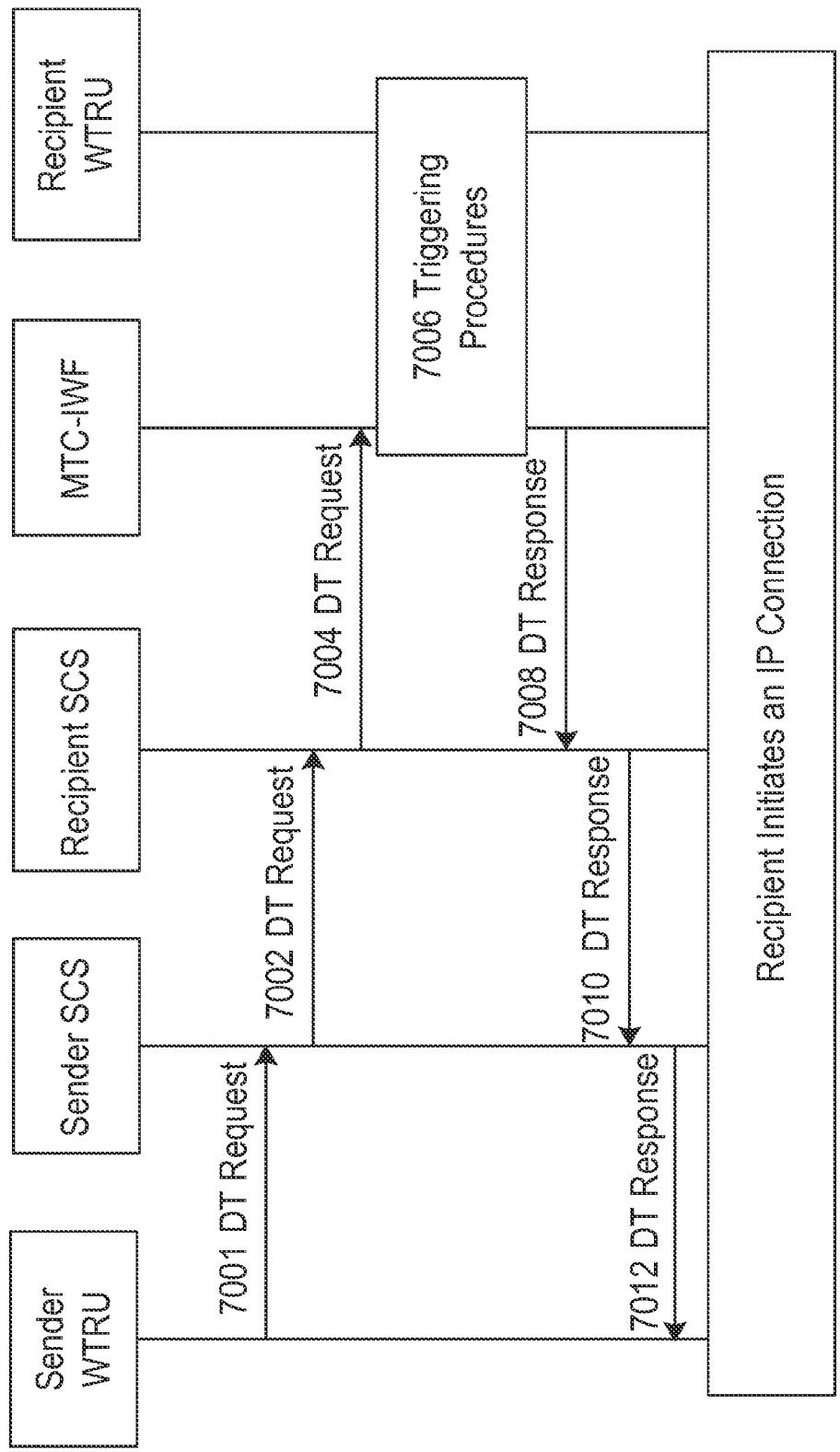
FIG. 7 illustrates an example signal flow for a trigger delivery via the SCS, consistent with embodiments.

Embodiments contemplate D2D Triggering via SCS. In some embodiments, the originating device may send a DT request message in an IP packet to an SCS over the user plane. This scheme may apply to scenarios such as where MTC UEs/WTRUs may communicate through SCS, for example, among other scenarios. An example technique is illustrated in FIG. 7. At 7001, the WTRU may send a trigger request to its SCS, for example via the SGi/Gi user plane (not shown). The trigger request may include one or more of the fields that are shown in in FIG. 8.

At 7002, the sender's SCS may forward the trigger request to the recipient's SCS. The recipient's SCS may verify that the sender is permitted to trigger the recipient. In some embodiments, the sender's SCS may determine the address of the recipient's SCS via a DNS look up, via an MTC-IWF query, and/or from the trigger request. The MTC-IWF may fetch the SCS address from the HSS, for example if it is determined via an MTC-IWF query, among other scenarios. In some embodiments, the sender and recipient may be registered to the same SCS. In such scenarios, among others, the SCS may forward one or more, or all, trigger requests directly to the MTC-IWF.

In some embodiments, it may be the role of the sender SCS to break the trigger request into one or more individual trigger requests that may be sent towards one or more individual devices and/or broadcast to smaller groups, perhaps if the trigger may be sent towards a group identifier, among other scenarios.

At 7004, the recipient SCS may forward the trigger request to the MTC-IWF, for example via the Tsp reference point (not shown). The trigger request may include one or more of the fields that are shown in FIG. 8.

At 7006, one or more trigger delivery procedures may be used to deliver the trigger to the recipient UE/WTRU. In some embodiments, the trigger message may be modified so that the recipient might not respond to the SCS and/or may respond to the device that initiated the trigger. In some embodiments, the MTC-IWF may validate that the SCS and/or the sender UE/WTRU may be authorized to trigger the recipient device.

At 7008, the MTC-IWF may send a report to the SCS that requested the trigger. The trigger report may include one or more of the fields that are shown in FIG. 9.

At 7010, the recipient's SCS may forward the trigger report to the sender's SCS. In some embodiments, the sender'SCS and the recipient's SCS may be the same.

At 7012, the sender's SCS may forward the trigger report to the sender UE/WTRU.

Figure 10:
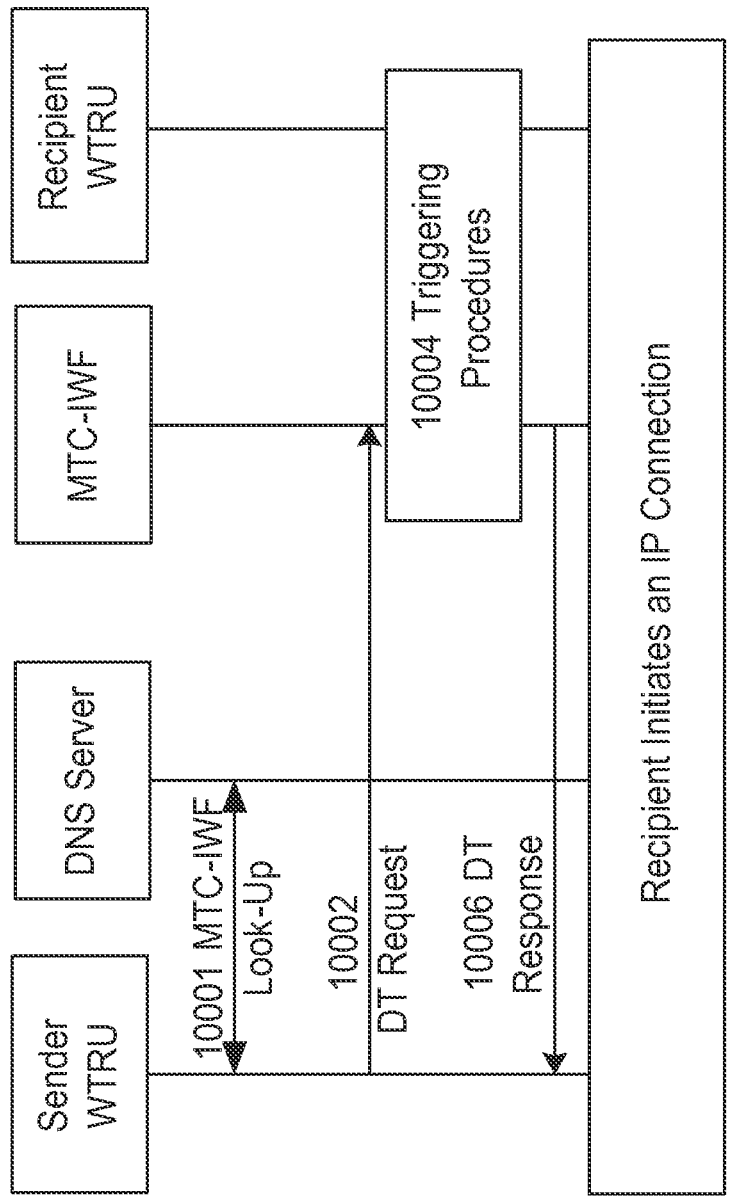
FIG. 10 illustrates an example signal flow for trigger delivery via the machine type communication inter-working function MTC-IWF (e.g., over the user-plane), consistent with embodiments.

Embodiments contemplate D2D Triggering via an MTC-IWF (e.g., over the user-plane). In some embodiments, the originating device may send a DT request message in an IP packet to an MTC-IWF over the user plane. One or more embodiments contemplate that the MTC-IWF may have a connection to the SGi/Gi reference point (not shown). An example technique is illustrated in FIG. 10.

At 10001, the sender UE/WTRU may use an external identifier of the recipient UE/WTRU to perform a DNS look-up of the MTC-IWF that may be used. The DNS Server may use the external identifier of the recipient UE/WTRU to look-up the IP address of the MTC-IWF that may be used. The DNS Server may provide the MTC-IWF IP address to the sender UE/WTRU.

At 10002, the sender UE/WTRU may send a device trigger request to the MTC-IWF via the SGi/Gi user plane (not shown). The trigger request may include one or more of the fields that are shown in FIG. 8. In some embodiments, it may be the role of the MTC-IWF to break the trigger request into one or more individual trigger requests that may be sent towards one or more individual devices and/or broadcast to smaller groups, perhaps if the trigger is sent towards a group identifier, among other scenarios.

At 10004, one or more trigger delivery procedures may be used to deliver the trigger to the recipient UE/WTRU. In some embodiments, the trigger message may be modified so that the recipient might not respond to the SCS and/or may respond to the device that initiated the trigger. In some embodiments, the MTC-IWF may validate that the SCS and/or the sender UE/WTRU may be authorized to trigger the recipient device.

At 10006, the MTC-IWF may provide a trigger report to the UE/WTRU that requested the trigger. The trigger report may include one or more of the fields that are shown in FIG. 9.

Figure 11:
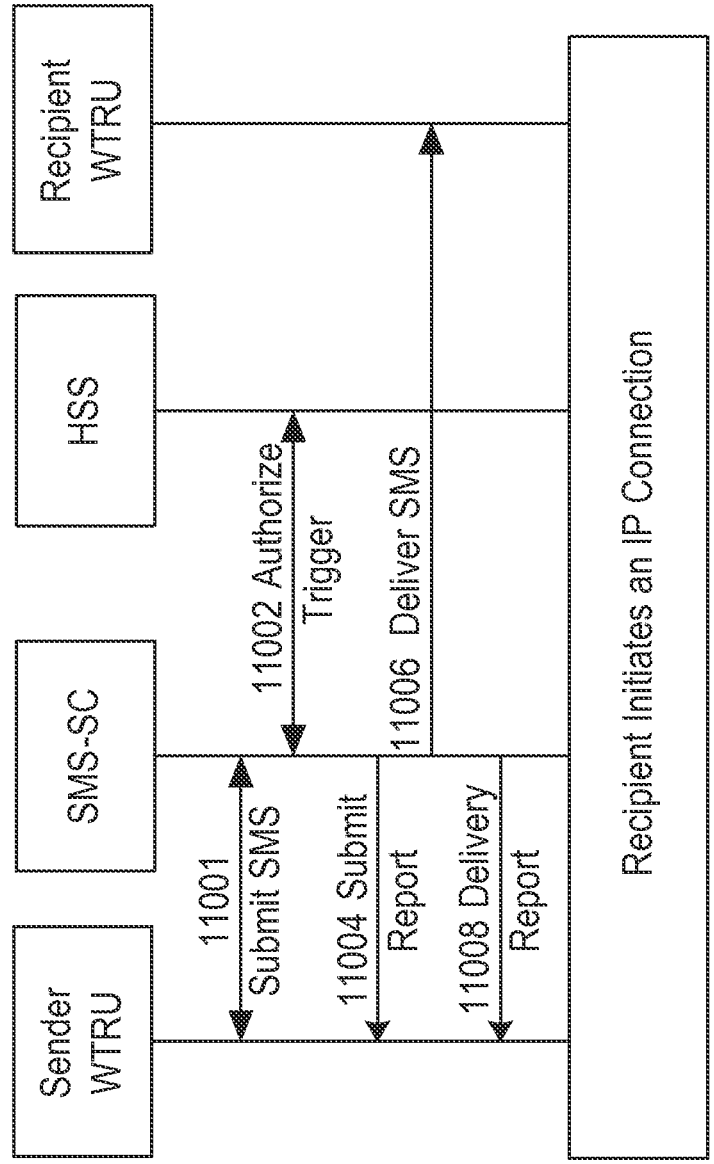
FIG. 11 illustrates an example signal flow for trigger delivery via short message service (SMS), consistent with embodiments.

Embodiments contemplate D2D Triggering via SMS. The originating device may send a DT request message in an SMS to the recipient. An example technique is illustrated in FIG. 11. At 11001, the sender UE/WTRU may send an SMS containing the trigger request to the SMS-SC. The trigger request may include one or more of the fields that are shown in FIG. 8.

At 11002, the SMS-SC may check that the sender UE/WTRU is authorized to send triggers to the recipient UE/WTRU. In some embodiments, the SMS-SC may perform the authorization by querying the HSS and/or the SMS-SC may request that an MTC-IWF (not shown) may perform the authorization (e.g., via the T4 reference point—not shown).

In some embodiments, it may be the role of the SMS-SC to break the trigger request into one or more individual trigger requests that may be sent towards one or more individual devices and/or broadcast to smaller groups, perhaps if the trigger is sent towards a group identifier, among other scenarios.

At 11004, the SMS-SC may report if the trigger was accepted by the SMS-SC. At 11006, one or more SMS delivery procedures may be used to deliver the trigger to the recipient UE/WTRU. In some embodiments, the trigger message may be modified so that the recipient might not respond to the SCS and/or may respond to the device that initiated the trigger. At 11008, the SMS-SC may report if the SMS was (or was not) delivered. The trigger report may include one or more of the fields that are shown in FIG. 9.

Figure 12:
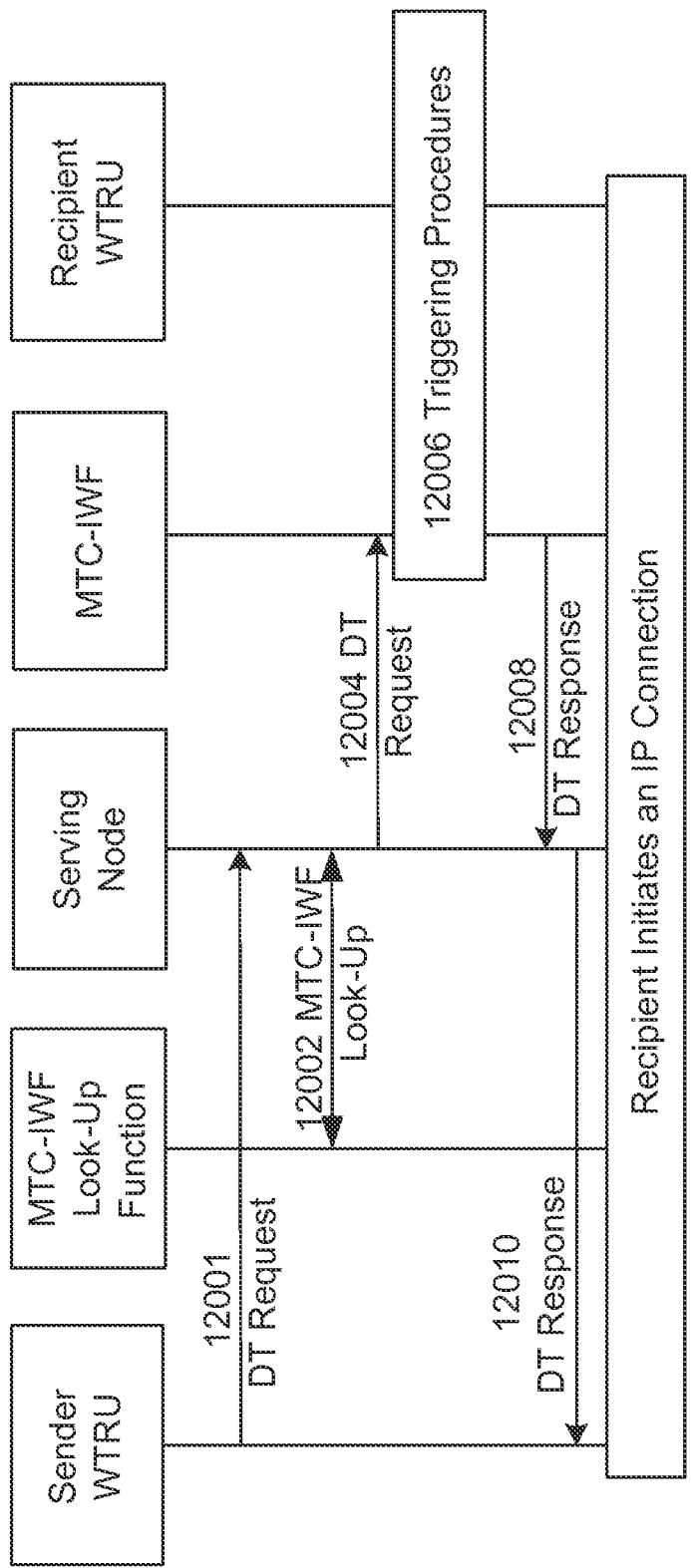
FIG. 12 illustrates an example signal flow for trigger delivery via the MTC-IWF (e.g., over the control Plane), consistent with embodiments.

Embodiments contemplate D2D Triggering via MTC-IWF (e.g., over the control-plane). The originating device may send a DT request message in an NAS message to an MTC-IWF, for example via the T5 reference point. An example technique is illustrated in FIG. 12. At 12001, the sender UE/WTRU may send a trigger request to a serving node in, for example, an NAS message. The trigger request may include one or more of the fields that are shown in FIG. 8.

At 12002, the serving node may use an external identifier of the recipient UE/WTRU to perform a look-up of the MTC-IWF that may be used. The lookup function may reside, for example, in the HSS (not shown) and/or a DNS server (not shown). The serving node may obtain the address of the MTC-IWF (IP Address, SS7 Address, and/or ISDN, or the like, for example).

At 12004, the serving node may send a trigger request to the MTC-IWF, for example via the T5 reference point (not shown). The trigger request may include one or more of the fields that are shown in FIG. 8.

At 12006, one or more trigger delivery procedures may be used to deliver the trigger to the recipient UE/WTRU. Trigger response and/or confirm messages may be returned to the serving node by the MTC-IWF.

In some embodiments, the trigger message may be modified so that the recipient might not respond to the MTC-IWF and/or may respond to the device that initiated the trigger. In some embodiments, the MTC-IWF may validate that the sender UE/WTRU may be authorized to trigger the recipient device.

In some embodiments, it may be the role of the MTC-IWF to break the trigger request into one or more individual trigger requests that may be sent towards one or more individual devices and/or broadcast to smaller groups, perhaps if the trigger is sent towards a group identifier, among other scenarios.

At 12008, the MTC-IWF may provide a trigger report to the serving node. The trigger report may include one or more of the fields that are shown in FIG. 9. At 12010, the serving node may provide a trigger report to the sender UE/WTRU, for example, in an NAS message. The trigger report may include one or more of the fields that are shown in FIG. 9.

Figure 13:
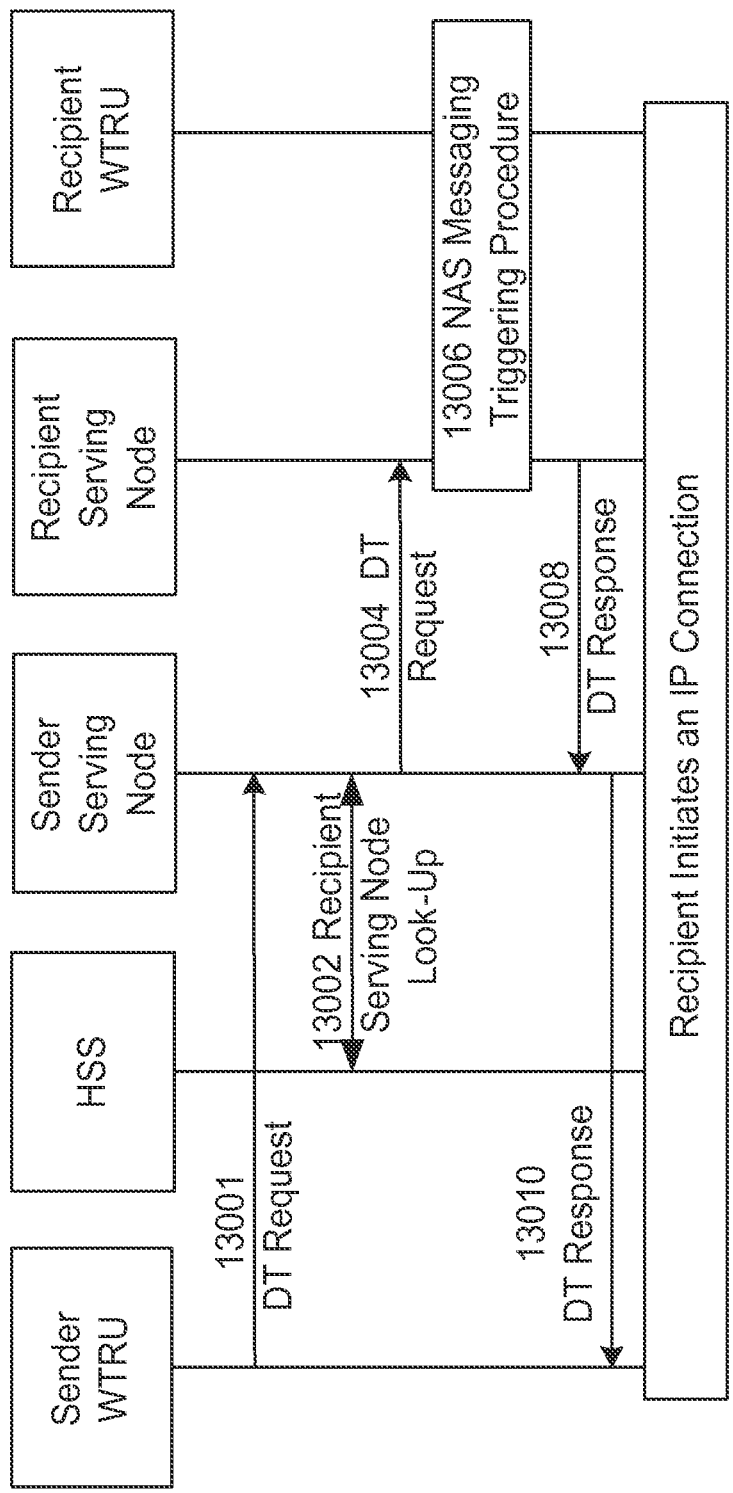
FIG. 13 illustrates an example signal flow for trigger delivery via one or more serving nodes, consistent with embodiments.

Embodiments contemplate D2D Triggering via Serving Nodes. The originating device may send a DT request message in, for example, an NAS message to the serving node of the recipient. The serving node may be an MSC, SGSN, S-GW, and/or MME, or the like, for example. An example technique is illustrated in FIG. 13. At 13001, the sender UE/WTRU may send a trigger request to the serving node in, for example, an NAS message. The trigger request may include one or more of the fields that are shown in FIG. 8.

At 13002, the serving node may use an external identifier of the recipient UE/WTRU to perform a look-up of the recipient's serving node. This operation may be over the S6a reference point and/or S11 reference point (not shown), for example.

In some embodiments, it may be the role of the serving node to break the trigger request into one or more individual trigger requests that may be sent towards one or more individual devices and/or broadcast to smaller groups, perhaps if the trigger is sent towards a group identifier, among other scenarios.

At 13004, the sender serving node may send a trigger request to the recipient serving node, for example via the S10 reference point (not shown). The trigger request may include one or more of the fields that are shown in FIG. 8.

At 13006, the trigger message may be sent to the recipient via NAS messaging, for example. Trigger response and confirm messages may be returned to the sender's serving node, for example via the S10 reference point (not shown).

At 13008, the recipient serving node may provide a trigger report to the sender serving node. The trigger report may include one or more of the fields that are shown in FIG. 9.

At 13010, the sender's serving node may provide a trigger report to the sender UE/WTRU in, for example, an NAS message. The trigger report may include one or more of the fields that are shown in FIG. 9.

Figure 14:
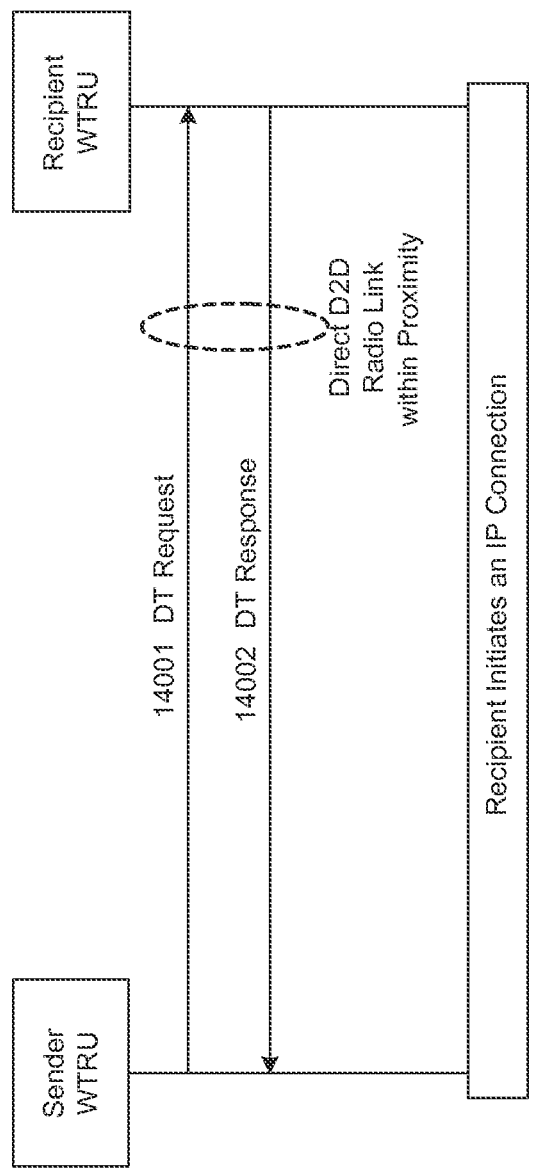
FIG. 14 illustrates an example signal flow for trigger delivery via direct radio link, consistent with embodiments.

Embodiments contemplate D2D Triggering via a direct D2D radio link. Embodiments contemplate scenarios in which at least two devices in proximity may have a direct radio link that may be suitable for control plane or small data exchange (which perhaps in some embodiments might not be suitable for sustained communication and/or large volumes of data). In such scenarios, among others, the sender UE/WTRU may send a trigger message over the direct radio link, perhaps in order to inform the recipient device that it may be useful to establish an IP connection, for example via the 3GPP core network. An example technique is illustrated in FIG. 14.

At 14001, the sender UE/WTRU may send a trigger request directly to the recipient UE/WTRU over the direct D2D radio link. The trigger request may include one or more of the fields that are shown in FIG. 8. In some embodiments, the trigger request may include the IP address of the sender UE/WTRU. In some embodiments, the trigger may be sent in a broadcast message that may be used to trigger one or more, or multiple, devices.

At 14002, the recipient UE/WTRU may provide a trigger report to the sender UE/WTRU via the direct D2D radio link. The trigger report may include one or more of the fields that are shown in FIG. 9.

In some embodiments, the direct D2D radio link may be a non-cellular radio link, such as but not limited to an IEEE 802.11 and/or IEEE 802.15.4 protocol based radio link. For example, an IEEE 802.15.4 protocol based radio link may carry a trigger message that may ask the recipient to establish an IP connection with the sender via the 3GPP core network.

In some embodiments, the direct D2D radio link could be facilitated by one or more helper nodes, such as for example, in the case of an IEEE 802.15.4 mesh network.

In some embodiments, the directD2D radio link could be a direct cellular radio link. The radio link could allow the direct exchange of control plane information (or short messages), perhaps without the involvement of the core network. This link may carry a trigger message that may ask the recipient to establish an IP connection with the sender via the 3GPP core network, for example.

Embodiments contemplate D2D Triggering via an Indirect D2D Radio Link (e.g., via BaseStation/NodeB/eNodeB). In one or more embodiments, the sender UE/WTRU may use one or more discovery techniques to determine that the recipient UE/WTRU may be in proximity. In some embodiments, the sender and recipient UE/WTRUs being in proximity may imply that they are behind the same base station and/or their base stations may support an interface for exchanging triggers.

Figure 15:
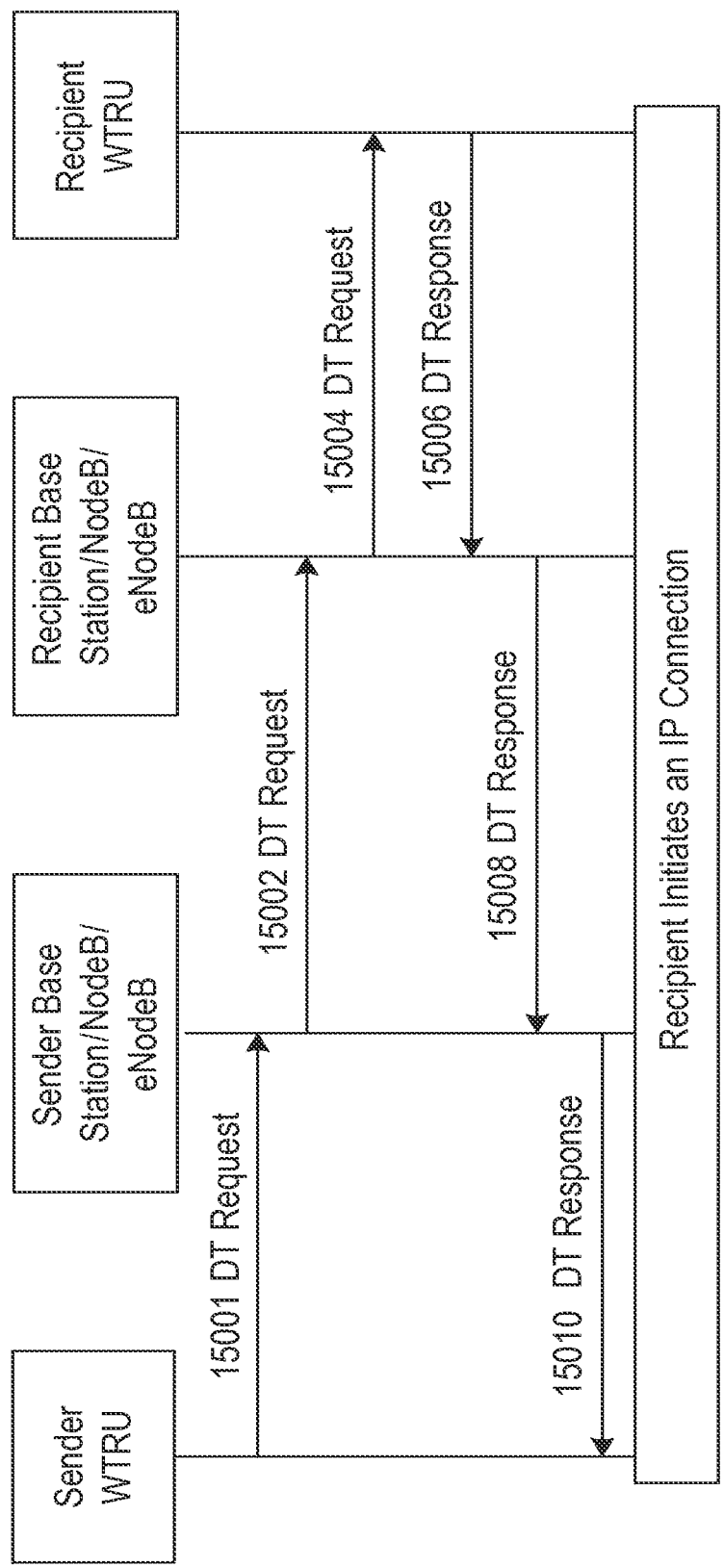
FIG. 15 illustrates an example signal flow for trigger delivery via indirect radio link.

In some embodiments, the one or more discovery techniques may provide the sender UE/WTRU with the identity of the recipient's bases station and/or the recipient's RNTI. The sender UE/WTRU may send a trigger message over the indirect radio link (e.g., relayed by base station/NodeB/eNodeB) to the recipient UE/WTRU. An example technique is illustrated in FIG. 15.

At 15001, the sender UE/WTRU may send a trigger request to the sender base station/NodeB/eNodeB. The trigger request may include one or more of the fields that are shown in FIG. 8. In some embodiments, the trigger request may include an IP address of the sender UE/WTRU.

At 15002, the sender base station/NodeB/eNodeB may forward the trigger request to the recipient base station/NodeB/eNodeB. In some embodiments, the sender base station/NodeB/eNodeB may be the same as the recipient base station/NodeB/eNodeB.

At 15004, the recipient base station/NodeB/eNodeB may forward the trigger request to the recipient UE/WTRU. In some embodiments, the trigger may be sent in a broadcast message that may be used to trigger one or more, or multiple, devices.

At 15006, the recipient UE/WTRU may provide a trigger report to the recipient base station/NodeB/eNodeB. The trigger report may include one or more of the fields that are shown in FIG. 9.

At 15008, the recipient base station/NodeB/eNodeB may forward the trigger report to the sender base station/NodeB/eNodeB. In some embodiments, the recipient base station/NodeB/eNodeB may be the same as the sender base station/NodeB/eNodeB. At 15010, the sender base station/NodeB/eNodeB may forward the trigger report to the sender UE/WTRU.

Although features and elements are described above in particular combinations, one of ordinary skill in the art may appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for communicating a device trigger performed by a node in communication with a wireless communication network, the method comprising:
    receiving a first device trigger (DT) request from a first wireless transmit/receive unit (WTRU), the first DT request including an Internet Protocol (IP) address of the first WTRU and a trigger reference number;
    identifying a machine-type-communication inter-working function (MTC-IWF) in response to the first DT request;
    sending a second DT request to the MTC-IWF, the second DT request including the Internet Protocol (IP) address of the first WTRU and the trigger reference number;
    receiving a first DT response from the MTC-IWF, the first DT response including an identifier of a second WTRU and the trigger reference number; and
    sending a second DT response to the first WTRU, the second DT response including the identifier of the second WTRU and the trigger reference number.

2. The method of claim 1, wherein the second DT request corresponds to the first DT request.

3. The method of claim 1, wherein at least one of: the first DT request or the second DT request includes at least one of: an indication for the second WTRU to activate a sensor or an amount of data for the second WTRU.

4. The method of claim 1, wherein the node is a serving node, the serving node being at least one of: mobile switch center (MSC), serving GPRS support node (SGSN), serving gateway (S-GW), or mobile management entity (MME).

5. The method of claim 1, wherein the first DT request is received in a non-access stratum (NAS) message.

6. The method of claim 1, wherein the identifying the MTC-IWF includes accessing a look-up function, the look-up function located in at least one of: a Home Subscriber Server (HSS) or a Domain Name System Server.

7. A method for communicating a device trigger performed by a first node serving a first wireless transmit/receive unit (WTRU), the first node in communication with a wireless communication network, the method comprising:
    receiving a first device trigger (DT) request from the first WTRU, the first DT request including an Internet Protocol (IP) address of the first WTRU and a trigger reference number;
    identifying a second node in response to the first DT request, the second node serving a second WTRU;
    sending a second DT request to the second node, the second DT request including the Internet Protocol (IP) address of the first WTRU and the trigger reference number;
    receiving a first DT response from the second node, the first DT response including an identifier of a second WTRU and the trigger reference number; and
    sending a second DT response to the first WTRU, the second DT response including the identifier of the second WTRU and the trigger reference number.

8. The method of claim 7, wherein the identifying the second node includes accessing a look-up function, the look-up function located in a Home Subscriber Server (HSS).

9. The method of claim 7, wherein at least one of: the first node or the second node is at least one of: a mobile switch center (MSC), a serving GPRS support node (SGSN), serving gateway (S-GW), or a mobile management entity (MME).

10. A first wireless transmit/receive unit (WTRU), the first WTRU comprising a processor, the processor configured, at least, to:
    identify a machine-type-communication inter-working function (MTC-IWF);
    send a device trigger (DT) request to the MTC-IWF via a user plane connection, the DT request including an Internet Protocol (IP) address of the first WTRU and a trigger reference number; and receive a DT response from the MTC-IWF, the DT response including a second information regarding a second WTRU, the DT response including an identifier of the second WTRU and the trigger reference number.

11. The first WTRU of claim 10, wherein the processor is further configured to identify the MTC-IWF by accessing a look-up function, the look-up function located in a Domain Name System Server.

12. The method of claim 1, wherein the identifier of the second WTRU is at least one of: a Mobile Subscription Integrated Service Digital Network (MSISDN) identifier, a Fully Qualified Domain Name (FQDN), a Uniform Resource Identifier (URI), or an Internet Protocol (IP) Address.

13. The method of claim 7, wherein the identifier of the second WTRU is at least one of: a Mobile Subscription Integrated Service Digital Network (MSISDN) identifier, a Fully Qualified Domain Name (FQDN), a Uniform Resource Identifier (URI), or an Internet Protocol (IP) Address.

14. The first WTRU of claim 10, wherein the identifier of the second WTRU is at least one of: a Mobile Subscription Integrated Service Digital Network (MSISDN) identifier, a Fully Qualified Domain Name (FQDN), a Uniform Resource Identifier (URI), or an Internet Protocol (IP) Address.

* * * * *